A. & C. WINCKLER.
BALE AND LIKE TRANSPORTER.
APPLICATION FILED NOV. 20, 1908.

964,079.

Patented July 12, 1910.
2 SHEETS—SHEET 1.

WITNESSES
W. P. Burk
A. F. Heuman

INVENTORS
Albert Winckler
Charles Winckler

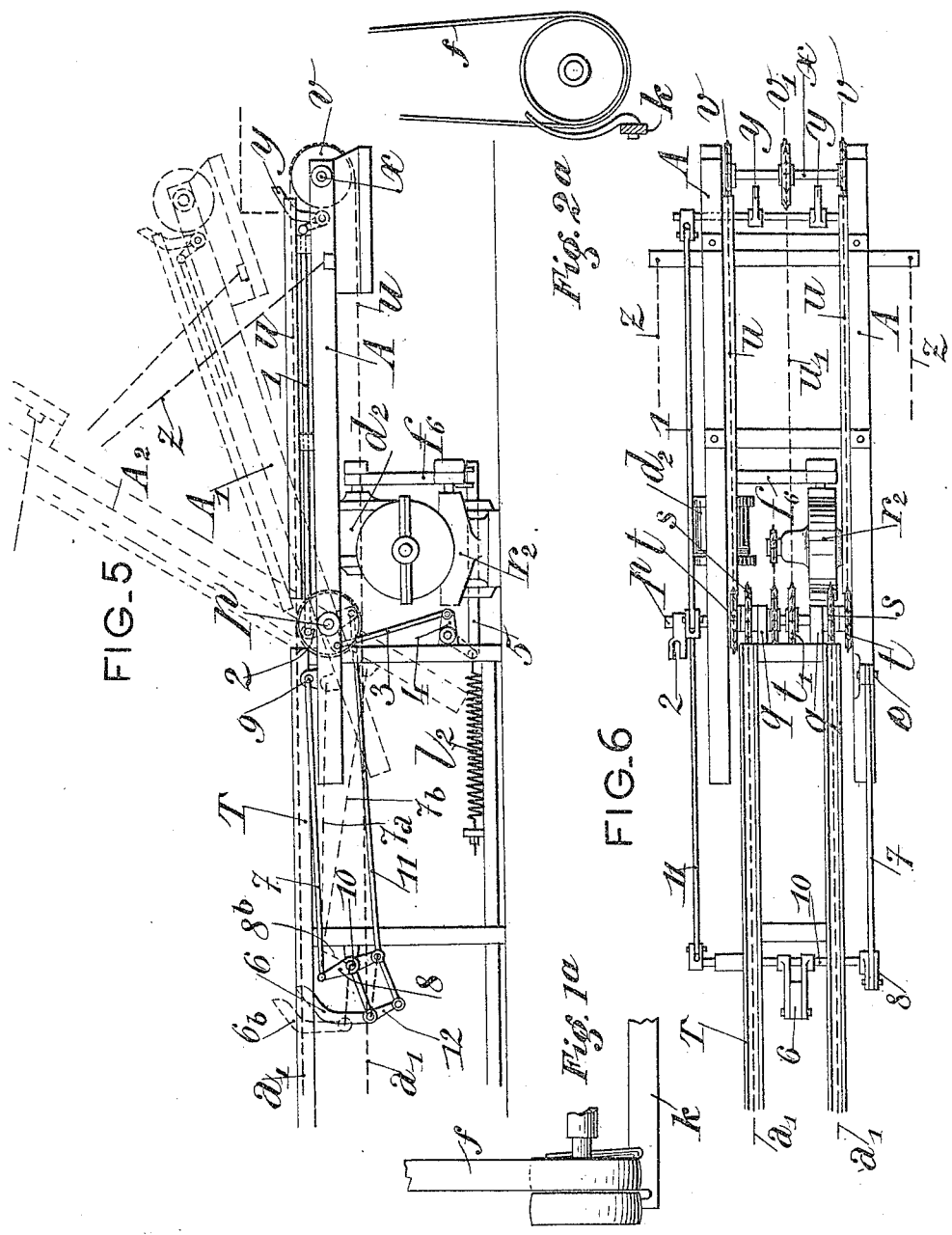

UNITED STATES PATENT OFFICE.

ALBERT WINCKLER AND CHARLES WINCKLER, OF LYON, FRANCE.

BALE AND LIKE TRANSPORTER.

964,079. Specification of Letters Patent. Patented July 12, 1910.

Application filed November 20, 1908. Serial No. 463,690.

*To all whom it may concern:*

Be it known that we, ALBERT WINCKLER and CHARLES WINCKLER, citizens of the French Republic, residing at Lyon, in France, have invented certain new and useful Improvements in Bale and Like Transporters, of which the following is a specification.

This invention relates to transporters intended for the conveyance of cases, bales, packages and the like of average dimensions in factories or warehouses and for loading or unloading the same on to or from wagons or trucks.

It essentially comprises under varying forms of construction two or more sprocket or like chains moved parallel to one another in a horizontal or inclined plane according to circumstances on which chains the packages to be conveyed are placed. Automatic mechanism arrests the movement of the chains when a package arrives at the end of the apparatus or at any other point previously determined.

The apparatus usually comprises three main parts viz: the unloader, the conveyers and the loader; the annexed drawing shows the general arrangement of these parts.

Figure 1:
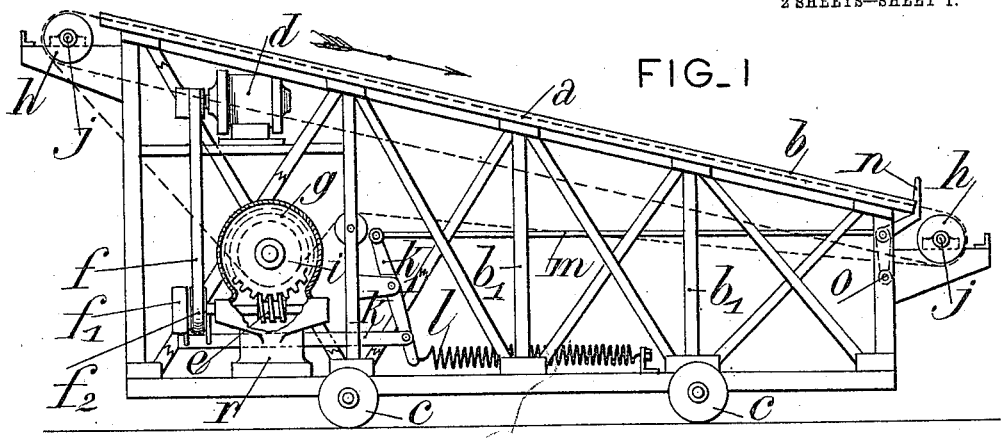
Figure 2:
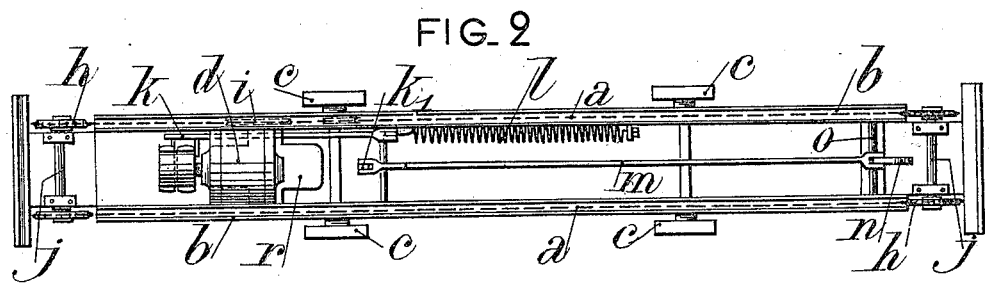
Figure 3:
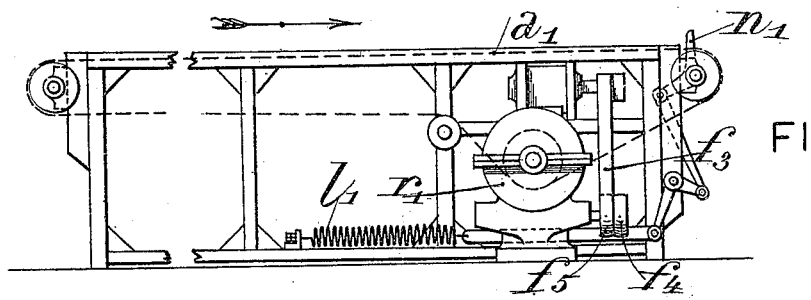
Figure 4:
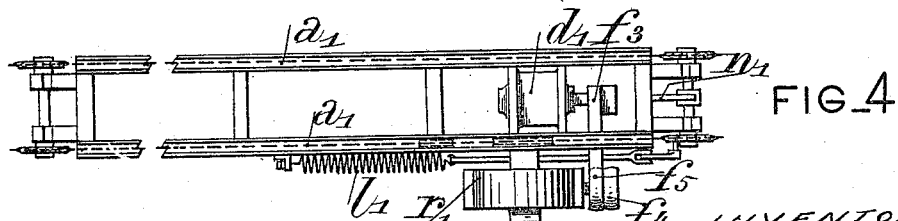

Figures 1 and 2 represent an unloader in elevation and plan respectively. Figs. 3 and 4 are similar views of a conveyer and Figs. 5 and 6 are also similar views of a loader.

In the unloader shown in Figs. 1 and 2 the upper surfaces of the parallel chains $a$ $a$ which receive the goods to be conveyed are disposed in inclined planes and receive on their elevated part the packages from a truck or wagon and conduct them to the level of the conveyers, this level being arranged at that most suitable for manipulation. The two chains $a$ $a$ are each carried at opposite ends of the apparatus by two toothed wheels $h$ $h$ keyed on shafts $j$ and their upper surfaces are guided in bars $b$ of trough section above which they project in order that said chains may support the goods being handled. The bars or guides $b$ are supported and maintained at the desired distance apart by a framing $b^1$ of suitable construction mounted on wheels $c$ $c$ which permit of moving the entire unloader to the proper distance relatively to the wagon to be unloaded.

Movement is imparted to the chains by an electric motor $d$ driving by means of a belt $f$ a suitable speed reducing gear inclosed in a casing $r$ and comprising a worm $e$ meshing with a worm wheel $g$. On the shaft of the latter is keyed a sprocket wheel $i$ about which passes one of the chains $a$ so as to be driven thereby, the other chain being correspondingly driven through the shafts $j$.

The movement of the chains may be arrested by mechanism consisting of a rod $k$ by means of which the belt $f$ can be shifted on to a loose pulley $f^1$, said strap $f$ being normally held on a fixed pulley $f^2$ by a spring $l$ attached to a lever $k$, which actuates the rod $k$. At its upper end the lever $k_1$ is connected by a draw rod $m$ to a lever or abutment $n$ pivoted at $o$, said abutment being arranged between the chains $a$ at the forward end of the apparatus, so that the goods being conveyed make contact with same, whereby the abutment is forced forward and puts the driving mechanism out of action. The movement of the chains is thus arrested and consequently all the goods conveyed thereby until the package causing such stoppage has been removed whereupon the belt $f$ will be again moved on to the fixed pulley $f^2$ by the spring $l$ and the movement of the chains will be resumed.

The goods removed from the lower end of the unloader are placed on different conveyers which conduct them direct to the desired points in the warehouse.

The conveyers shown in Figs. 3 and 4 are of different lengths and of sufficient number to serve the different parts or departments of the warehouse or dépôt where they are in use. The said conveyers are constructed on the same principle as the unloader with the exception that their upper surface is horizontal and disposed at such a height as is most suitable for convenient handling in front of the unloader in order that the goods may pass easily from one to the other. The conveyers are usually stationary, their chains $a^1$ $a^1$ are put in movement similarly to those of the unloader, by an electric motor $d^1$ driving by means of belt $f^3$ a speed reducing gear contained in a casing $r^1$ which gear actuates one of the chains. The belt $f^3$ is put out of action on to a loose pulley $f^4$ by the abutment $n^1$ when a package comes in contact therewith, the belt being again shifted on to a fixed pulley $f^5$ by a spring $l^1$ and intermediate mechanism when the package is removed from the conveyer.

The loader shown in Figs. 5 and 6 is arranged in continuation of a conveyer T arranged as previously described and extended by a movable extension A pivoted on a horizontal shaft $p$ rotating in bearings $q$ fixed to the end of the conveyer. The said shaft $p$ is rotated by the motor $d^2$ by means of a speed reducing gear contained within a casing $r^2$ and a movable strap $f^6$. On the shaft $p$ are keyed two sprocket wheels $s\ s$ driving the chains $a^1\ a^1$ of the conveyer. At the center of the shaft $p$ is keyed a sprocket wheel $t_1$ adapted to drive the wheel $v_1$ by means of the chain $u_1$ said wheel $v_1$ being keyed to a shaft $x$ at the forward end of the loader. On the said shaft $x$ are keyed two other wheels $v\ v$ driving the two lateral chains $u\ u$ passing at the opposite end around the wheels $t\ t$ freely rotatable on the shaft $p$. The chains $u\ u$ serve to convey the packages along the loader. The forward end of the extension $a$ may be raised by means of two chains or ropes $z\ z$, so that it can be brought to a convenient height for loading, said chains $z$ being operated by means of a winch or other suitable device (not shown).

The packages fed along by the conveyer T pass on to the extension A along which they are moved by the chains $u$ until they meet the abutment $y$ which by means of the rod 1, angle lever 2, rod 3, and angle lever 4 acts on the belt shifting rod 5 drawn back by the spring $l^2$ and arrests the movement of the chains until the package has been removed. So long as the extension A remains in a horizontal or only slightly inclined position the abutment $y$ actuates the belt shifting mechanism alone but when said extension is in a more inclined position it is necessary to arrest the packages before they reach the extension which they would not be able to mount; in this case a second abutment 6 is arranged near the end of the conveyer and arranged so as to be clear of the packages and allow them to pass on to the extension as is shown in full lines in Fig. 5 while it is caused to rise into active position when the extension is raised to such an extent that it cannot be mounted by the packages. This result is obtained by a rod 7 connecting the lever 8 to a pivotal point 9 on the end of the extension the position of the point being such that with a moderate inclination of the extension the lever 8 will not be effectively displaced, while it is drawn back by the rod 7 when greater inclination of the extension takes place.

The lever 8 is keyed on a shaft 10 on which is mounted the abutment 6 by means of a parallelogram 12 which supports it in a vertical position causing it to assume the position 6$^a$ shown in broken lines when the extension is raised and it then acts on the belt shifting mechanism by means of a rod 11 when it is engaged by a package.

It will be understood that the arrangements hereinbefore described can be varied according to requirements, the various apparatus can also be movable as in Fig. 1 or fixed as in Figs. 3 and 5, and the moving elements thereof can be actuated by motors of any kind, or by belts or other transmission mechanism.

What we claim as our invention and desire to secure by Letters Patent of the United States is:—

1. In combination, a conveyer, a frame pivoted thereto, conveying chains supported on said frame, driving means for said chains, normally inoperative means associated with said conveyer adapted to be moved into the path of the articles being conveyed to be actuated thereby for putting the driving means out of action, means for raising the free end of said frame, and means actuated when said frame is raised for moving said normally inoperative means into operative position.

2. In combination, a conveyer, a frame pivoted thereto, conveying chains supported on said frame, driving means for said chains, normally inoperative means associated with said conveyer adapted to be moved into the path of the articles being conveyed to be actuated thereby for putting the driving means out of action, means for raising the free end of said frame, means positioned at the free end adapted to be moved by the articles being conveyed to put said driving means out of action, and means actuated when said frame is raised for moving said normally inoperative means into operative position.

3. A conveyer comprising a frame, parallel conveying chains supported by said frame in a horizontal plane, means for driving said chains, an abutment at one end thereof adapted for movement by the article to put the chain driving means out of action, a frame pivoted to said conveyer, conveying chains carried by said frame, means for driving said chains, means for raising the end of said frame about its pivot, an abutment at the free end of said frame adapted for movement by the articles to put the chain driving means out of action, and means actuated when said frame is raised for bringing the abutment on the conveyer into operative position.

4. A conveyer, comprising a frame, a transverse shaft mounted at the end thereof, a second frame having one end pivoted to said shaft, sprocket wheels on said shaft, conveying chains supported by the frame of the conveyer passing over some of said sprocket wheels, conveying chains carried by the second frame passing over some of said sprocket wheels, means for supporting the other ends of both sets of chains, means for raising said second frame about its pivot, a motor for operating said chains, a stop at the free end of the second frame for disconnecting the motor, a stop near the end of the conveyer frame for disconnecting the motor, said stop being normally out of operative position, and means operated by the raising of the second frame for throwing said stop into operative position.

In witness whereof we have signed this specification in the presence of two witnesses.

ALBERT WINCKLER.
CHARLES WINCKLER.

Witnesses:
GASTON JEANNIANSC,
THOMAS N. BROWNE.